(12) United States Patent
Huitema et al.

(10) Patent No.: US 9,070,322 B2
(45) Date of Patent: Jun. 30, 2015

(54) ELECTROFLUIDIC CHROMATOPHORE (EFC) DISPLAY APPARATUS

(75) Inventors: Hjalmar Edzer Ayco Huitema, Eindhoven (NL); Petrus van Lieshout, Eindhoven (NL); Fredericus Johannes Touwslager, Eindhoven (NL)

(73) Assignee: Creator Technology B.V., Breda (NL)

( * ) Notice: Subject to any disclaimer, the term of this patent is extended or adjusted under 35 U.S.C. 154(b) by 313 days.

(21) Appl. No.: 13/566,971

(22) Filed: Aug. 3, 2012
(Under 37 CFR 1.47)

(65) Prior Publication Data

US 2013/0141405 A1 Jun. 6, 2013

Related U.S. Application Data

(60) Provisional application No. 61/515,341, filed on Aug. 5, 2011.

(51) Int. Cl.
*G09G 3/34* (2006.01)
*G09G 3/28* (2013.01)
*G02B 26/00* (2006.01)

(52) U.S. Cl.
CPC .............. *G09G 3/28* (2013.01); *G02B 26/005* (2013.01)

(58) Field of Classification Search
None
See application file for complete search history.

(56) References Cited

U.S. PATENT DOCUMENTS

| | | | |
|---|---|---|---|
| 132,404 A | | 10/1872 | Mateer |
| 4,426,451 A | * | 1/1984 | Columbus ............... 436/518 |
| 4,583,824 A | * | 4/1986 | Lea ........................ 359/223.1 |
| 4,940,642 A | * | 7/1990 | Shirai et al. .................. 430/65 |
| 5,006,432 A | * | 4/1991 | Sagou et al. .................. 430/23 |
| 5,557,843 A | * | 9/1996 | McKenney et al. ............ 29/851 |
| 6,462,266 B1 | * | 10/2002 | Kurth ........................ 136/251 |
| 6,639,580 B1 | * | 10/2003 | Kishi et al. ................. 345/107 |
| 8,004,738 B2 | * | 8/2011 | Yang et al. .................. 359/245 |
| 2002/0113840 A1 | * | 8/2002 | Trauernicht et al. ........... 347/47 |
| 2003/0011869 A1 | * | 1/2003 | Matsuda et al. ............. 359/296 |
| 2003/0020685 A1 | * | 1/2003 | Richley et al. .............. 345/105 |
| 2004/0067347 A1 | * | 4/2004 | Curcio et al. ................ 428/209 |
| 2004/0106914 A1 | * | 6/2004 | Coppeta et al. ............ 604/892.1 |
| 2004/0226820 A1 | * | 11/2004 | Webber et al. .............. 204/471 |
| 2005/0110397 A1 | * | 5/2005 | Masuda ...................... 313/504 |
| 2005/0142466 A1 | * | 6/2005 | Tsubata et al. ................ 430/7 |
| 2005/0275695 A1 | * | 12/2005 | Murata ........................ 347/70 |
| 2006/0007272 A1 | * | 1/2006 | Ogata et al. .................. 347/70 |
| 2006/0105275 A1 | * | 5/2006 | Maloney et al. ............. 430/320 |
| 2006/0132404 A1 | | 6/2006 | Hayes et al. |

(Continued)

FOREIGN PATENT DOCUMENTS

WO  WO 2004/068208 A1  8/2004
WO  WO 2009/036272 A1  3/2009

*Primary Examiner* — Amare Mengistu
*Assistant Examiner* — Antonio Xavier

(57) ABSTRACT

A display apparatus includes a plurality of electrofluidic chromatophore (EFC) pixel cells. Each pixel cell includes a fluid holder for holding a polar fluid and a non-polar fluid having differing display properties, the fluid holder including a reservoir having an orifice with a small visible area projected in the direction of a viewer onto the polar fluid, and a channel with a geometry having a large visible area projected in the direction of a viewer onto the polar fluid. The channel is connected to the reservoir via said orifice so as to enable free movement of the polar fluid and non-polar fluid between the channel and the reservoir. The reservoir is formed in a laminated resin structure of homogenous resin film layers, including an orifice film layer and a reservoir film layer.

10 Claims, 11 Drawing Sheets

(56) References Cited

U.S. PATENT DOCUMENTS

| | | | |
|---|---|---|---|
| 2007/0004221 A1* | 1/2007 | Whitman et al. | 438/758 |
| 2007/0040982 A1 | 2/2007 | Nakano et al. | |
| 2007/0127108 A1* | 6/2007 | Hayes et al. | 359/245 |
| 2007/0268245 A1* | 11/2007 | Sugita et al. | 345/107 |
| 2008/0224595 A1* | 9/2008 | Nakamata et al. | 313/500 |
| 2009/0046082 A1* | 2/2009 | Jacobson et al. | 345/204 |
| 2009/0059348 A1* | 3/2009 | Niwano et al. | 359/296 |
| 2009/0174687 A1* | 7/2009 | Ciesla et al. | 345/174 |
| 2009/0283895 A1* | 11/2009 | Kikuchi et al. | 257/692 |
| 2009/0284683 A1* | 11/2009 | Usukura et al. | 349/62 |
| 2010/0182290 A1* | 7/2010 | Matsuoka et al. | 345/205 |
| 2010/0208328 A1* | 8/2010 | Heikenfeld et al. | 359/290 |
| 2010/0227471 A1* | 9/2010 | Leung et al. | 438/637 |
| 2010/0238388 A1* | 9/2010 | Hayashi et al. | 349/106 |
| 2010/0248569 A1* | 9/2010 | Peng et al. | 442/31 |
| 2010/0283941 A1* | 11/2010 | Nemoto et al. | 349/63 |
| 2010/0309541 A1* | 12/2010 | Lo et al. | 359/292 |
| 2011/0007056 A1* | 1/2011 | Huitema | 345/211 |
| 2011/0025668 A1* | 2/2011 | Huitema et al. | 345/211 |
| 2011/0183267 A1* | 7/2011 | Tsuda | 430/315 |
| 2011/0217838 A1* | 9/2011 | Hsieh et al. | 438/618 |
| 2011/0221726 A1* | 9/2011 | Huitema | 345/209 |
| 2012/0086691 A1* | 4/2012 | van Lieshout et al. | 345/211 |
| 2012/0168309 A1* | 7/2012 | Heikenfeld et al. | 204/518 |
| 2013/0128336 A1* | 5/2013 | Dean et al. | 359/290 |

* cited by examiner

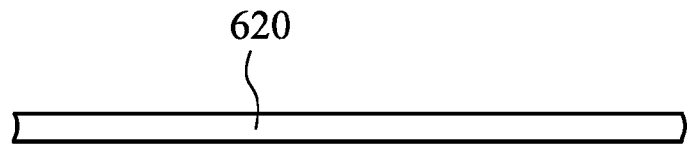
FIG. 6A (i)
(PRIOR ART)
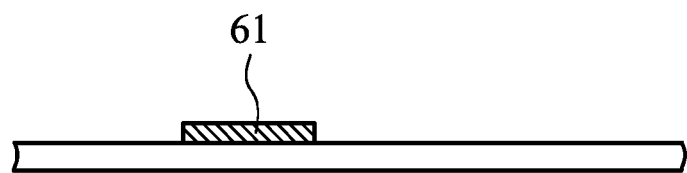
FIG. 6A (ii)
(PRIOR ART)
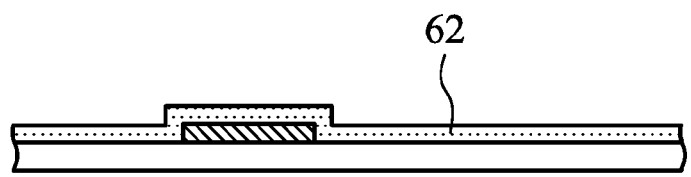
FIG. 6A (iii)
(PRIOR ART)

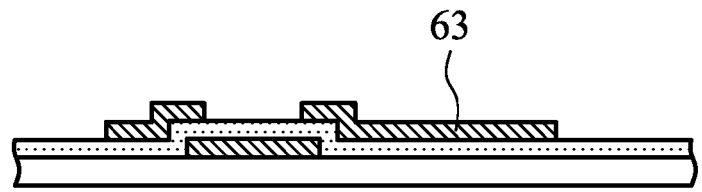
FIG. 6A (iv)
(PRIOR ART)
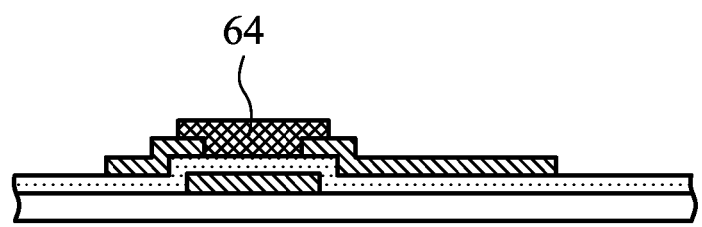
FIG. 6A (v)
(PRIOR ART)
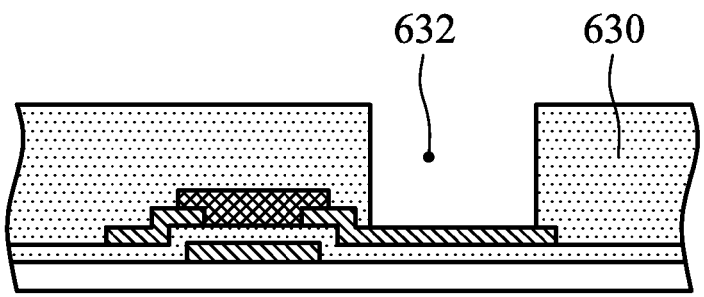
FIG. 6A (vi)
(PRIOR ART)

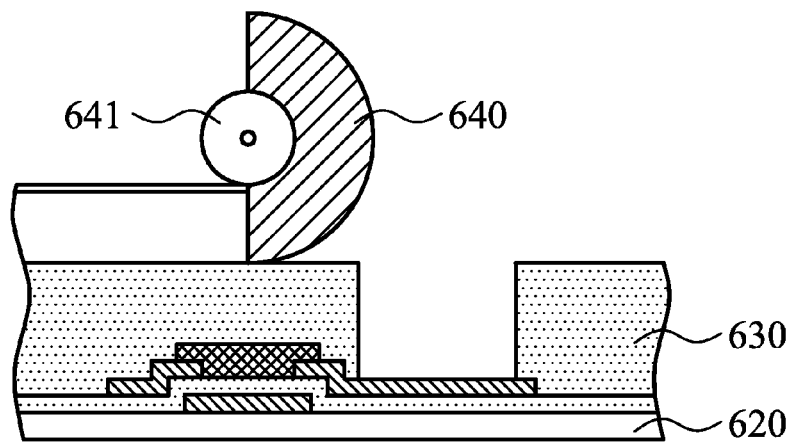
FIG. 6B (vii)
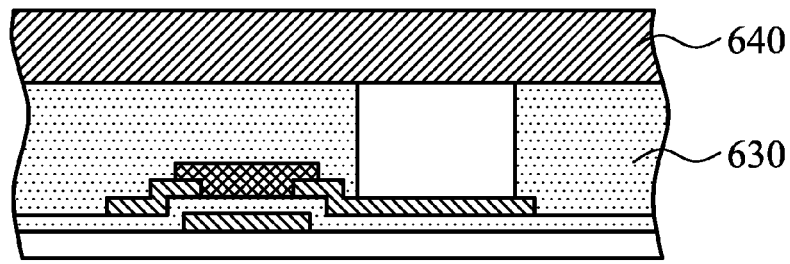
FIG. 6B (viii)
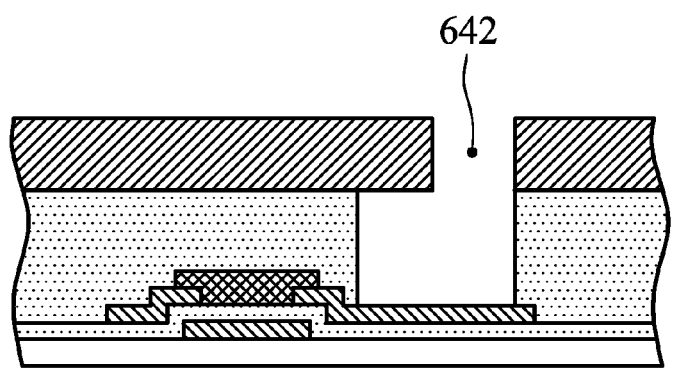
FIG. 6B (ix)

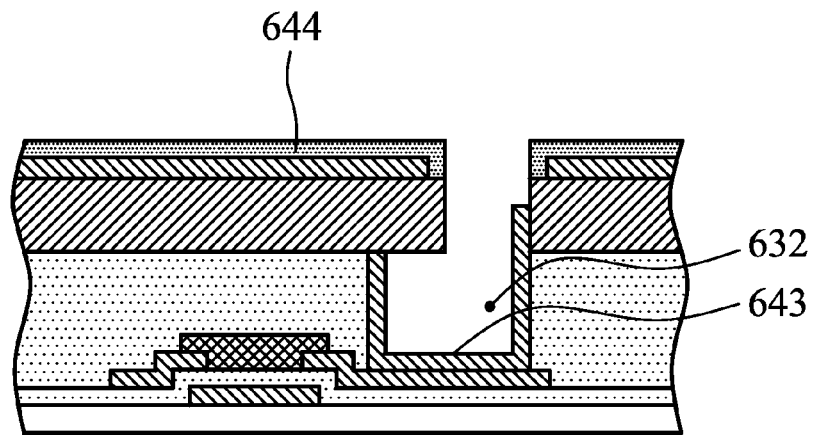
FIG. 6C (x)
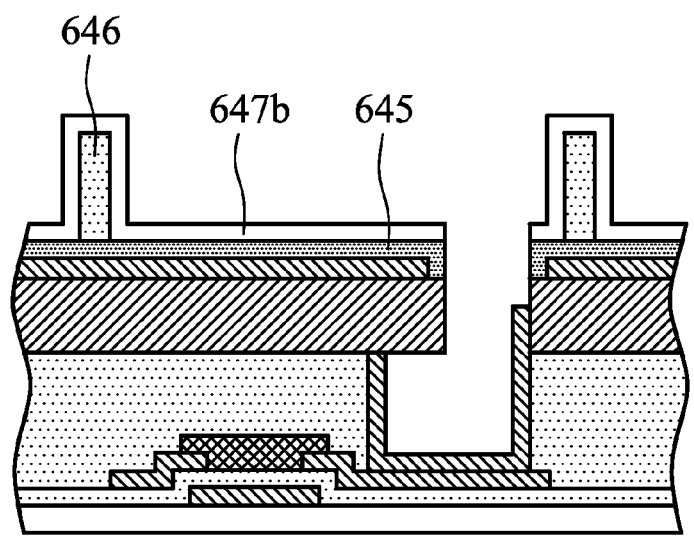
FIG. 6C (xi)

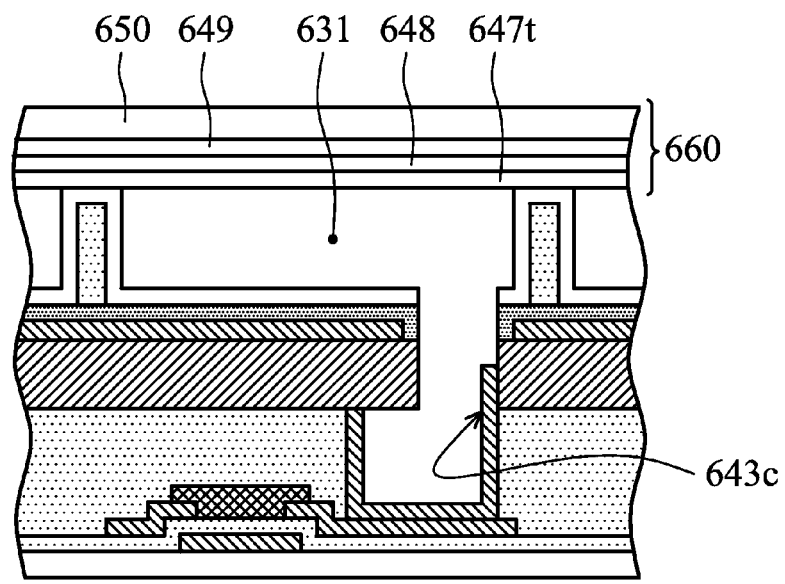
FIG. 6D (xii)
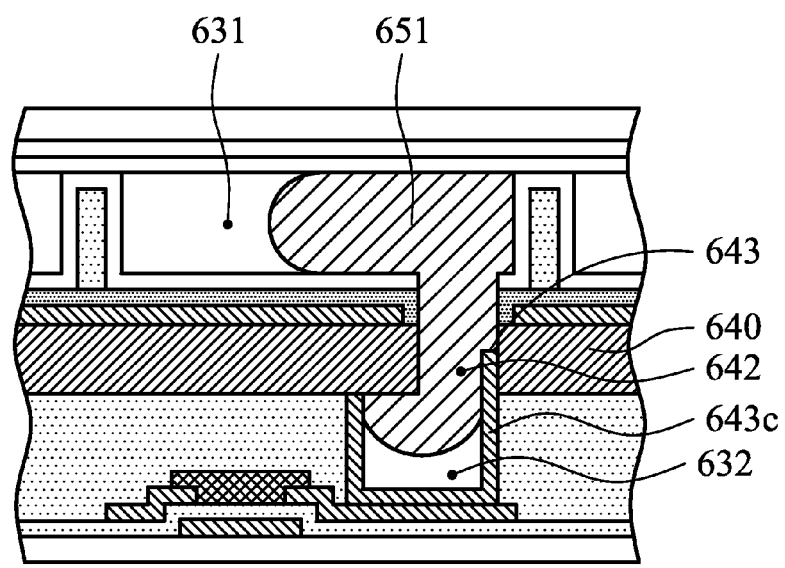
FIG. 6D (xiii)

ELECTROFLUIDIC CHROMATOPHORE (EFC) DISPLAY APPARATUS

This application claims the benefit of U.S. Provisional Application Ser. No. 61/515,341, filed on Aug. 5, 2011, which is hereby incorporated by reference.

TECHNICAL FIELD

The invention relates to the field of displays, in particular, displays comprising electrofluidic cells.

DESCRIPTION OF RELATED ART

Up to now, in certain areas of display technology, an electrophoretic electro-optical medium is commonly used, in particular for flexible displays. However, the electrophoretic electro-optical medium is subject to a number of restrictions. The medium has a relatively slow pixel response that makes video display challenging and has a relatively low brightness compared to paper.

Displays based on the electrowetting electro-optical medium may remedy at least some of the restrictions mentioned above. Particular variants using this principle are e.g. described in publications WO2004068208 and WO 2009036272. These variants have a height dimension that is relatively large compared to liquid crystal or electrophoretic displays which hinders the use in flexible displays.

In prior art patent U.S. Pat. No. 4,583,824 a bi-stable display device has been proposed where a thin sheet of material separates two channels with the same height. By making holes in the sheet the fluid can flow between the two channels. As the two channels have the same height the display can be bi-stable. When the colored fluid is pumped to the lower channel the viewer can only see this fluid in the hole in the sheet, thereby creating a large aperture.

In this case a complex structure is proposed where the fluids must be driven both in the top and the bottom channel in order to switch the pixel. The sheet must be positioned very accurately in order to create a top and a bottom channel with identical height.

The recently developed Electrofluidic Chromatophore (EFC) variant of a display based on electrowetting has a smaller height dimension and may therefore be more suitable to use in flexible displays. Because pixels in displays based on the EFC technology have a high reflectivity, these displays can be used in situations ranging from dim ambient lighting to full sun-lit.

In the remainder, we will refer to an EFC cell as a pixel cell comprising a fluid holder for holding a polar fluid and a non-polar fluid having differing display properties, the fluid holder comprising a reservoir having an orifice with a small visible area projected in the direction of a viewer, and a channel with a geometry having a large visible area projected in the direction of a viewer, the channel being connected to the reservoir via said orifice so as to enable free movement of the polar fluid and non-polar fluid between the channel and the reservoir, at least part of a surface of the channel comprising a wetting property responsive to a supply voltage over the pixel cell and defining (i) a stable region wherein the supply voltage stabilizes the amount of polar fluid in the channel; (ii) a fill region that controls the flow of polar fluid into the channel and (iii) a retract region that controls the flow of polar fluid into the reservoir; and at least two pixel cell terminals being configured to supply the supply voltage to at least part of the surface of the fluid holder comprising the wetting property for supply voltage controlled movement of polar fluid.

The EFC pixel cell will respond in dependency of the supplied voltages, in particular, the fill or retract level of the polar fluid will be controlled. The various conditions that the EFC cell can exhibit as a result of these controlled voltages may in the remainder be also referred to as cell display properties or cell states, more particular, a fill state, retract state or stable state, to correspond to the visual appearance a black state, white state or more generally a colour state that can be stable or change dependent on the supply voltage.

The state of an EFC cell is not directly related to the voltages at the terminals. Instead, these voltages and their timing control the rate and direction of change of the state. Therefore in a driving scheme a current state of the cell is taken into account and certain voltages are applied at the cell terminals for a certain time to reach the new, desired state. Actual voltage levels can be influenced by cell geometry and material properties.

From a user viewpoint, the cell aperture controls the effective area of the pixel that can be switched between different colored or grey levels. In the hereabove arrangement, the cell aperture is largely determined by the channel with a geometry having a large visible area and the reservoir having a geometry with a small visible area projected in the direction of a viewer.

The reservoir is occupied by the polar fluid in every switching state of the pixel. In addition, the reservoir holds sufficient polar fluid to completely fill the channel and reservoir with polar fluid in one extreme switching state from the user viewpoint. For a typical pixel arrangement a conventional reservoir arrangement may cover 5-20% of the pixel area, although this can vary in a broader range depending on the application and materials used. For example, for a pixel that has lateral dimensions of 150×150 micrometer with an effective pixel size of 143×143 micrometer (e.g. a 7 micrometer border area that cannot be switched) and a channel height of 3 micrometer and a reservoir height of 54 micrometer, the reservoir may have an area that is at least 5% of the pixel area; for the same pixel where the channel height is 5 micrometer and the reservoir height is 23 micrometer, the reservoir may have an area that is at least 20% of the pixel area.

As the reservoir containing the polar liquid is viewable, this cell area fraction reduces the aperture of the display. Thus, in the conventional arrangement of the channel and reservoir, the EFD pixel aperture is limited by the reservoir size that may have a more or less visible effect affecting the contrast and color saturation of the EFC display. US2010/0208328 shows a solution wherein the polar fluid is further hidden from the visible area of the electrofluidic device.

SUMMARY

According to an aspect of the invention, there is provided a display apparatus comprising a circuit board having row and column electrodes arranged thereon to connect a driver to a plurality of electrofluidic chromatophore (EFC) pixel cells provided on the circuit board. Each pixel cell comprises a fluid holder for holding a polar fluid and a non-polar fluid having differing display properties. The fluid holder comprises a reservoir having an orifice with a small visible area projected in the direction of a viewer and a channel with a geometry having a large visible area projected in the direction of a viewer. The channel is connected to the reservoir via said orifice so as to enable free movement of the polar fluid and non-polar fluid between the channel and the reservoir. At least part of a surface of the channel comprising a wetting property and at least two pixel cell terminals connectable to the row and column electrodes on the circuit board and being configured to supply a supply voltage to at least part of the surface of the channel comprising the wetting property for supply voltage controlled movement of polar fluid. The at least two pixel cell terminals are dielectrically separated from the polar fluid. The reservoir is formed in a stacked structure of homogenous film layers arranged on the circuit board, the structure at least comprising an orifice film layer and a reservoir film layer, wherein the reservoir arranged in the reservoir layer is obscured in the direction of a viewer by the orifice film layer, said orifice film layer defining a smallest orifice area that is smaller than a cross sectional area formed in the reservoir film layer.

In this way the reservoir is formed in a stack structure of stacked homogenous film layers of a homogenous film material and the viewable orifice cross-section is reduced to increase the cell aperture. The advantage is that a large aperture EFD is realized with standard and common processing methods. The solution does not rely on multiple electrowetting surfaces or an electrowetting surface in the lower layers of the stack, as found in prior art proposals.

BRIEF DESCRIPTION OF THE DRAWINGS

FIG. 6A shows a schematic manufacturing process for manufacturing the first conventional steps of the electrofluidic pixel cell;

FIG. 6B schematically shows manufacturing steps for forming a reservoir hiding structure;

FIG. 6C schematically shows finishing steps to provide a pixel cell with a partly hidden reservoir;

FIG. 6D shows the finished product;

DESCRIPTION OF THE EMBODIMENTS

Figure 1:
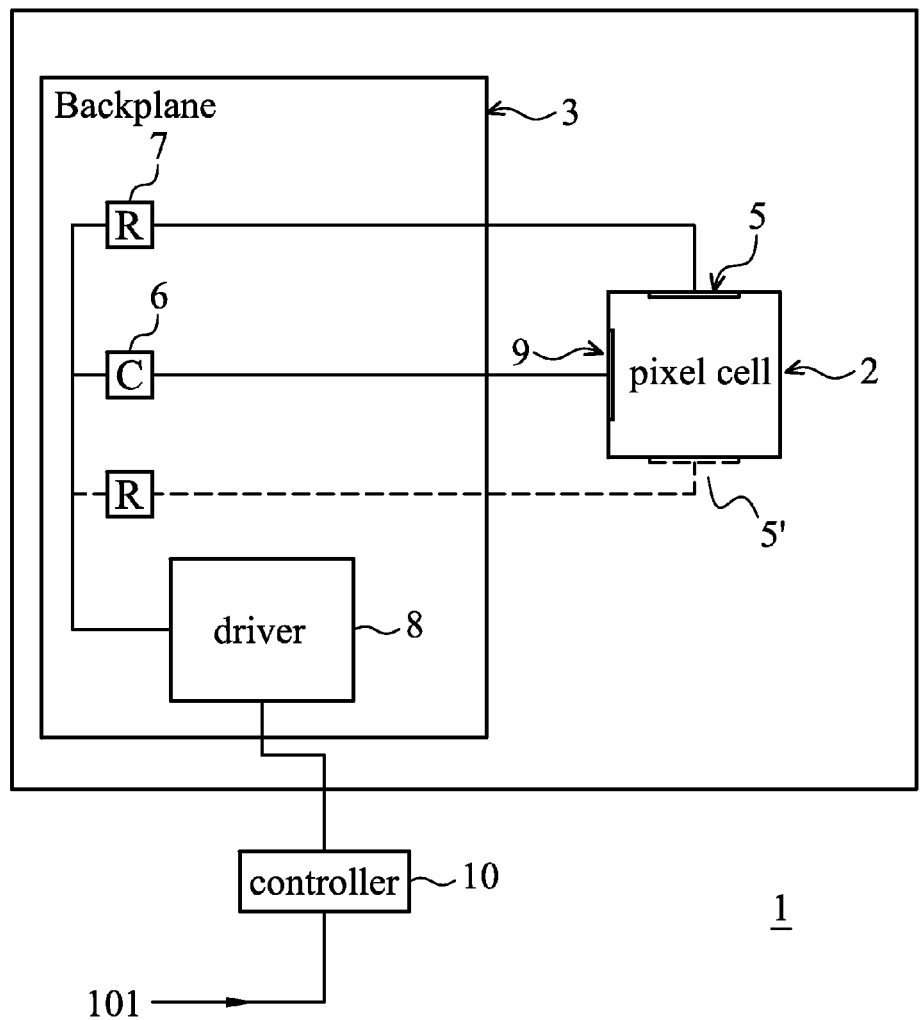
FIG. 1 shows a schematic configuration of an embodiment of the display apparatus.

FIG. 1 shows a schematic configuration of an embodiment of the display apparatus. Besides a plurality of pixel cells 2, the display apparatus 1 further comprises a flexible circuit board 3, in the art also referenced as backplane and preferably bendable with a small radius for example smaller than 2 cm—so that the display can be rolled, flexed or wrapped in a suitably arranged housing structure. The circuit board 3 comprises a plurality of row electrodes and column electrodes for supplying an electrical charge to the pixel cells 2. It may however also be possible that more electrodes are connected to the pixel cell 2, depending on the specific implementation. A driver 8 is configured to charge the row 7 and column electrodes 6 to address a supply voltage to the pixel cells 2. The driver 8 may be incorporated in the circuit board 3 or any other convenient place.

A display controller 10 is arranged to control the driver 8 as a result of pixel image information 101 inputted in the display controller 10. Typically, the display 1 is refreshed a number of times per second. The frame time is defined as the time wherein all the pixels of a display are refreshed once. The frame time comprises a line selection time, wherein the pixel cells 2 connected to a row 7 are activated, followed by a hold time, wherein the other rows are sequentially addressed. Alternatively other update schemes may be provided, e.g. with multiple row addressing, where more than one row is selected and refreshed at a time.

While a supply voltage can be typically supplied to a pixel cell 2 via a single row and column electrode 6, 7, pixel cell 2 can be additionally connected with another row electrode 5', typically, having a further pixel cell terminal that is electrically connected to a further electrode 5' directly connected to the driver 8 to provide a bias supply voltage or basic supply voltage to the pixel cell as will be explained hereafter. The additional bias electrode can be provided as a patterned electrode parallel to the row electrodes. In such an arrangement a pixel cell intermediate condition can be provided. This condition can be defined as a state of the pixel cell wherein the possible cell display property changes are limited due to the supply of a basic supply voltage to the at least one further pixel cell terminal with the aim to reduce the switched voltage required to induce a change in the cell display property. The switching circuit typically has row and column electrodes 6, 7 respectively that connect the switching circuit to the driver 8, although it is also possible that more or less electrodes are used depending on the specific implementation of the switching circuit.

The switching state of an electrofluidic pixel cell 2 is not directly related to the voltages at the terminals 5, 9. Instead, these voltages and their timing control the rate and direction of change of the switching state. Therefore, to drive a cell to a certain switching state, differential driving is needed, i.e. driving that takes into account the current switching state of the cell 2 and applies certain voltages at the cell terminals 5, 9 for a certain time to reach the new desired switching state. One possibility is that a copy of the currently displayed image is kept and used in the calculation of the driving signals for the new image. Another option is to reset the entire display to a known switching state, e.g. the state in which all cells 2 are fully retracted, (in the absence of supply voltage) and apply certain driving signals by driver 8 to display a new image.

Figure 2:
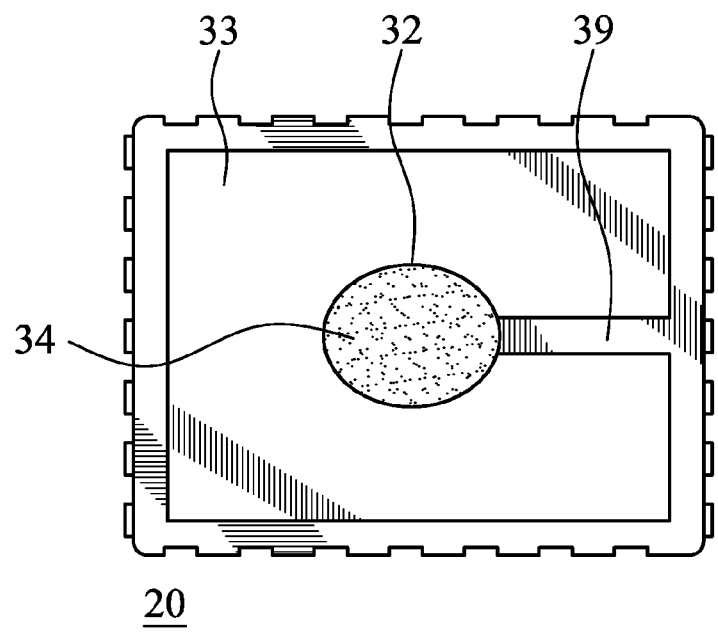
FIG. 2 shows a top view of an embodiment of an electrofluidic pixel cell in the embodiment of FIG. 1.
Figure 3:
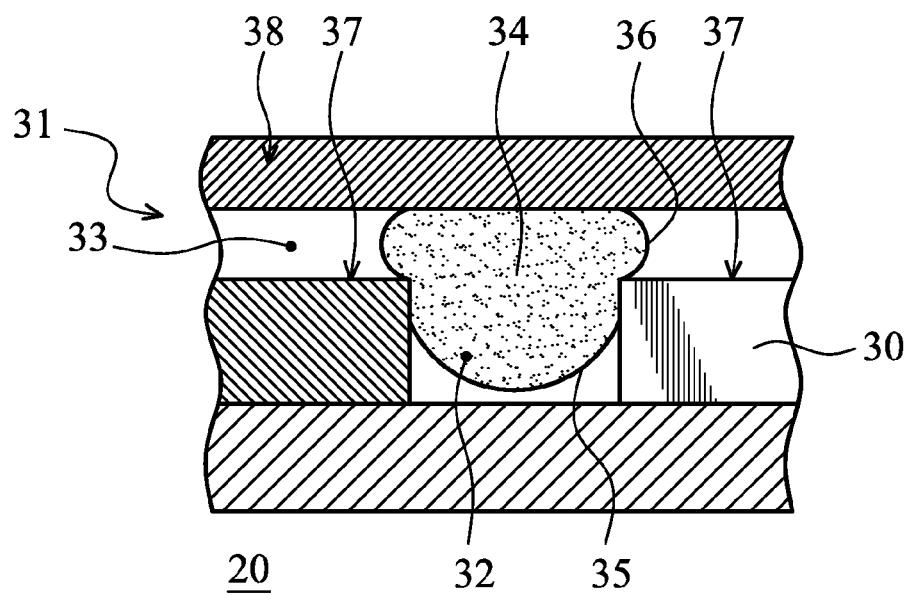
FIG. 3 shows a cross sectional side view of the electrofluidic pixel cell of FIG. 2.
Figure 4A:
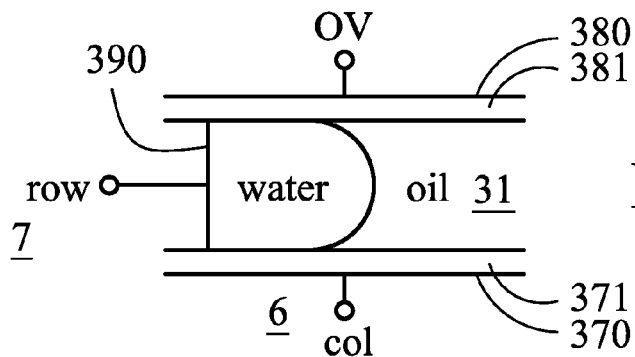
FIG. 4 shows various schematic connections for connecting the electrofluidic pixel cell to a matrix electrode structure.
Figure 4B:
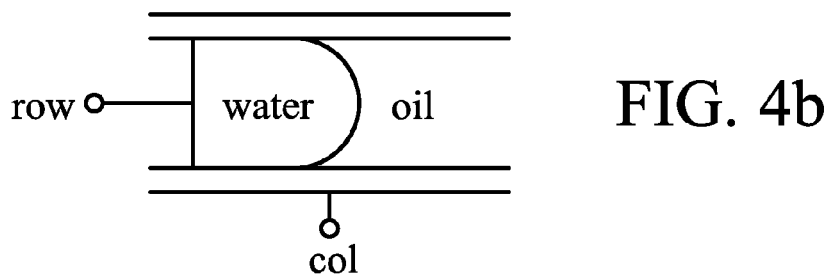
Figure 4C:
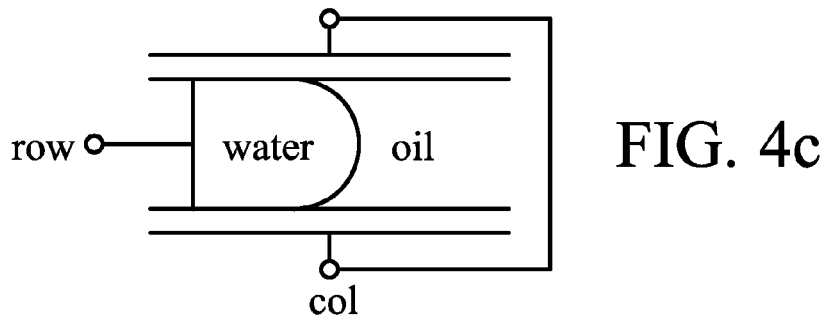
Figure 4D:
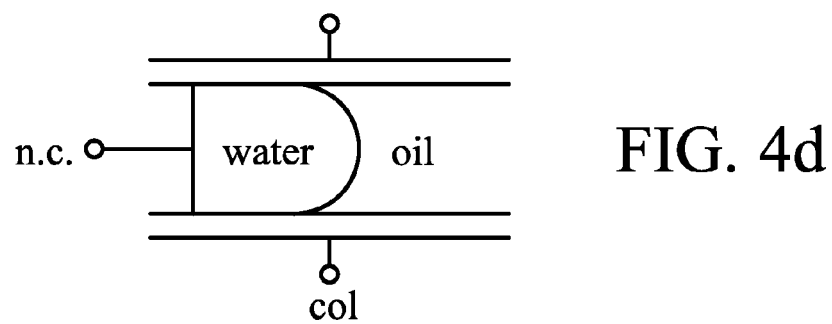

FIG. 2 shows a top view of the electrofluidic pixel cell shown in cross sectional view in FIG. 3. It may be seen that the geometry of fluid reservoir 32 imparts a small visible area projected in the direction of a viewer and the geometry of the channel 33 imparts a large visible area projected in the direction of a viewer. The fluid reservoir 32 and the channel 33 are connected so as to enable free movement of polar fluid 34 between the channel 33 and the fluid reservoir 32.

To create a black state, the blackened water 34 occupies the channel 33 and the clear oil occupies the fluid reservoir 32. In the white state, the clear oil occupies the channel 33 and the blackened water occupies the reservoir 32. By varying the amount of black water and clear oil in the channel 33, various cell display properties, also named colour states, may be created.

With sufficient electrical bias between the polar fluid and the electrodes close to the surface of the channel the water is pulled into the channel and the oil is flowing through the few micrometer wide duct 39 back into the reservoir.

Instead of black water any suitably coloured or clear polar fluid may be used; instead of clear oil any suitably coloured or clear non-polar fluid may be used, as long the two fluids are sufficiently immiscible.

A colour display variant may be implemented by using water of different colours for different pixel cells, for example red, green and blue or cyan, magenta and yellow, or by providing a colour filter on top of a black and white display or by integrating the colour filter in the display on or near the top surface 38 of the channel 33.

The channel 33 is typically 3 to 5 um in height; the thickness of the mesa 30 defining the lower channel wall 37 is typically 40 um and forms a reservoir 32. The theoretical switching speed is in the order of milliseconds for both transitions.

FIG. 3 shows a fluid holder 31 of pixel cell 2 (FIG. 1) in cross sectional view. The channel 33 is typically 3-5 micrometer in height; the thickness of the mesa or reservoir layer 30, determining the height of the reservoir, is typically 30-50 micrometer. The theoretical switching speed is in the order of milliseconds for both transitions, thus enabling a display capable of showing full motion video. The fluid holder comprises a fluid reservoir 32 with a small visible area projected in the direction of a viewer and a channel 33 with a large visible area projected in the direction of a viewer. Typically, besides a polar fluid 34, the fluid holder 31 also comprises a non-polar fluid (not shown). To generate a cell display property, the polar fluid 34 and the non-polar fluid have differing display properties. A display property may e.g. be a colour, also encompassing monochromatic variants or a certain transmission and/or reflection characteristic of the fluid. In one embodiment, the polar fluid 34 has a transmission differing from the non-polar fluid. The polar fluid 34 may comprise water and the non-polar fluid comprises oil. Preferably the water is blackened and the oil is left clear or is diffuse scattering, because blackening water with pigments may yield a more saturated black than blackening oil with dyes. Pigmented blackened water may result in a sufficiently black pixel colour with a layer of water with a thickness of only 3 micrometer. This allows a display with a total thickness less than 100 micrometer, which typically is within a suitable thickness range for flexible displays. Typically the water contains ionic content as the conductive element. The non-polar fluid may occupy the space not occupied by the polar fluid 34. The non-polar fluid is preferably immiscible with the polar fluid 34.

In an embodiment, the geometry of the channel 33 and the fluid reservoir 32 are carefully constructed to impart a mutually differing principle radius of curvature. In such embodiments, the fluid reservoir 32 imparts a large principle radius 35 of curvature onto the polar fluid and the channel imparts a small principle radius 36 of curvature onto the polar fluid 34 when the surfaces of the channel 33 and the fluid reservoir 32 are sufficiently hydrophobic.

This configuration results in a Young-Laplace force that aims to bring the polar fluid in its energetically most favourable shape, i.e. the droplet shape and urges the polar fluid 34 into the fluid reservoir 32.

On the other hand, however, the polar fluid 34 may be urged into the channel 33 by generating an electromechanical force larger than and opposite to the Young-Laplace force. To control this force, at least part of a surface 38 of the channel 33 and the lower channel wall 37 comprises a wetting property responsive to an applied supply voltage to one or more of the walls of the fluid holder 31. The polar fluid 34 may comprise a conductive element or component. Typically a hydrophobic fluoropolymer is provided on at least part of the surface 38 of the channel 33 and the lower channel wall 37, although other materials having a wetting property responsive to an electric field may be applied.

The electromechanical force is directed opposite to the counteracting force that urges the polar fluid 34 into the fluid reservoir 32 and may be controlled by varying the supply voltage. This counteracting force may be the Young-Laplace force or another, oppositely directed, electromechanical force or a combination of those.

A supply voltage providing a balance of counteracting force and electromechanical force, i.e. a voltage whereby movement of the polar fluid 34 is absent is called the stable voltage. Although the stable voltage may show variation depending on the cell display property, it is in principle unrelated to the cell display property. That is, substantially independent of the fluid front position, the stable voltage will stabilize the fluid front of the polar fluid 34. It is noted that this characteristic may not be found in other display types like electrophoretic or liquid crystal displays. In other words, providing the stable supply voltage to a pixel cell stabilizes the polar fluid 34 in the pixel cell 20.

By applying a supply voltage to at least a part of the channel surface 37, 38 of the channel 33, the induced electric field typically reduces the hydrophobic character of the fluoropolymer and results in an electromechanical force, aiming to bring the polar fluid 34 from the reservoir 32 into the channel 33 that is proportional to the supply voltage over the at least part of the channel surface 37, 38 squared. The supply voltage changes the wetting property of at least part of the surface 37, 38 of the channel 33.

Varying the electromechanical force may be used to control the movement of the polar fluid 34 in the pixel cell 20. Therefore, the pixel cell 20 comprises at least two pixel cell terminals (not shown). The pixel cell terminals are arranged to apply a supply voltage via electrodes (not shown) to the at least part of the surface of the channel 33 comprising the wetting property responsive to an applied supply voltage. The supply voltage may be provided by a combination of voltage differences, from any of a number of electrodes attached to the pixel cell.

FIG. 4 a-d shows various schematic connections for connecting the electrofluidic pixel cell to a matrix electrode structure. At the top and bottom of the channel, there are planar electrodes 380, 370 covered by dielectric layer 371, 381. A single third electrode 390 can be in electrical contact with the polar fluid droplet. Alternatively, the top electrode can be left out. Care has to be taken that the wetting properties of the top wall of the channel 33 (shown in FIG. 2, 3) are optimized in this case. For reading convenience the reference numerals are only indicated in FIG. 4a.

Electromechanical force on the water-oil front is caused by a voltage across a dielectric stack including the fluoropolymer layer. In passive-matrix configuration, there are row and column electrodes, with a pixel at each crossing.

In more detail, the configuration of FIG. 4 (a) shows a common terminal being connected to a common electrode for a group of pixels or all pixels in the display. This electrode can alternatively or additionally provide a bias voltage as discussed here below. In some embodiments as illustrated by the configurations of FIG. 4 (b) a patterned top electrode 380 is not needed, which is an advantage because it allows for much simpler manufacturing. A galvanic connection to the water is provided for water electrode 390. Because the driving forces have to be generated by the dielectric interface on the lower wall 37 (shown in FIG. 3), the supplied voltages are relatively high. The configuration of FIG. 4 (c) and (d) comprise a patterned top electrode 380 that is electrically connected to a column driver or row driver, in addition to a patterned bottom electrode 370. The supply voltages can be lower because both dielectric interfaces to the water are used to generate the electromechanical force. In FIG. 4 (d), the water electrode 390 can be dispensed with so that the column voltage terminal 6 is coupled only to a bottom channel electrode 370 on a side facing away from a direction of the viewer. In the FIG. 4 a-c embodiments, the row electrode 7 is coupled to a contact electrode contacting the conductive polar fluid. In the embodiment shown in FIG. 4d the row electrode 7 is coupled to a channel electrode 380.

Figure 5:
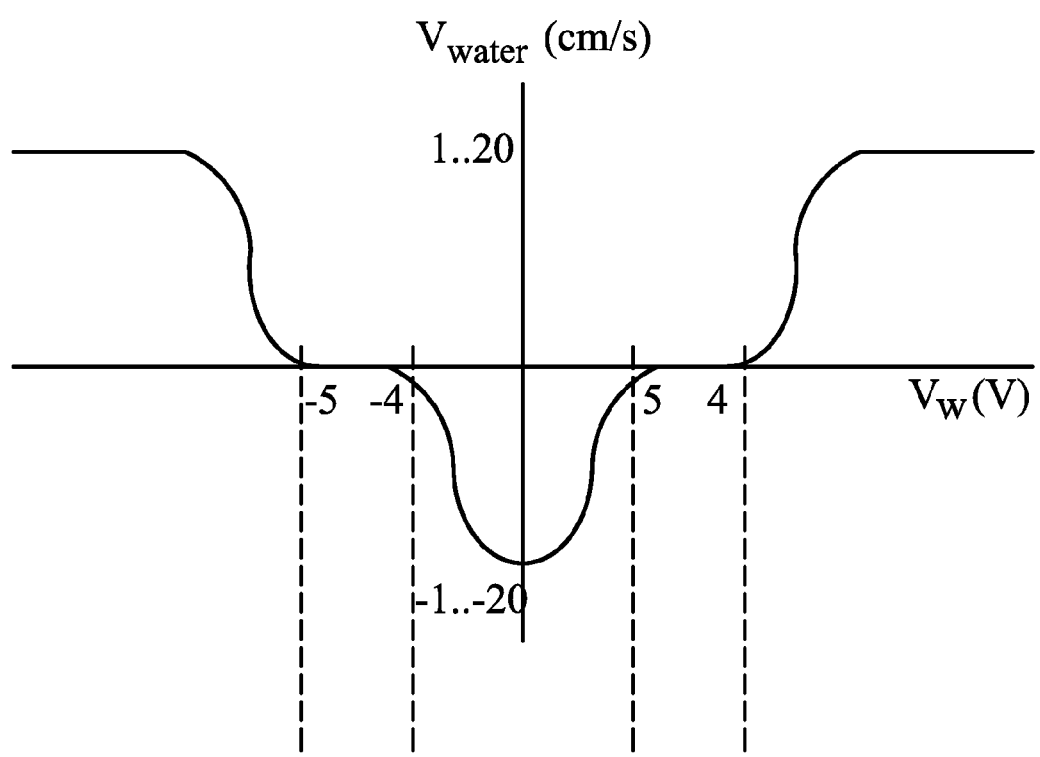
FIG. 5 shows a schematic chart of the water front velocity (v) in the pixel channel as a function of the supply voltage (V)

FIG. 5 shows a schematic chart of the water front velocity (v) in the pixel channel as a function of the supply voltage (V). The shown voltage levels and the exact shape of this curve can be influenced by cell geometry and the properties of the applied materials, such as oil viscosity.

The electromechanical force that pulls the water into the channel is proportional to the applied voltage squared. This results in a symmetrical response around 0V (see FIG. 2). Here it is assumed that the top (t) and bottom (b) electrodes are put at the same bias with respect to the water (w) electrode. For a realistic cell, a voltage over the channel of around 4-5V keeps a certain switching state (the "stable" voltage); at a voltage below ~2V the water retracts into the reservoir (the "retract" voltage) with a negative speed; at a voltage above ~7V the water advances into the channel (the "fill" voltage) with a positive speed. At higher voltages the speed of the water increases, but saturates at a certain maximum. This effectively gives a response according to the integral of switching speed and time, where the switching speed is proportional to the sum of the voltage squared. The voltages can also be applied asymmetrical between the top and the water and the bottom and the water as long as the sum of the voltages squared is the same. The retraction speed is highest when the water is at the same bias as the top and the bottom electrodes.

The width of the stable region on the x-axis is non-zero due to the effects of wetting hysteresis or a wetting barrier that is inherent to the materials used in the pixel cell, or that is purposely added to define the stable range by modifying the channel wetting property. The effect of these barriers is to locally increase the width of the stable region to lower voltages and to higher voltages, respectively, yielding preferential states of the oil-water distribution in the pixels. These preferential states can be used as discrete gray levels or as an intermediate starting level from which gray levels can be reached faster and more accurate.

These barriers may be provided by physical structures locally influencing an applied electric field to the channel surface having a wetting property, by physical structures locally influencing the wetting property or by physical structures locally influencing the radius of curvature and thus the Young-Laplace pressure of the polar liquid in the channel. These barriers may also include a change in the chemical composition at the surface which has strong influence on the wetting properties.

The speed of the water front typically is in the order of centimeters per second and preferably between 0 and 50 centimeters per second, as 28 centimeters per second yields a switching speed between the black and the white state of about 1 millisecond for a pixel cell size of 0.2 millimeters (having a 0.28 millimeters diagonal size) when the reservoir is positioned in the corner of the pixel cell, which is compatible with displaying video content on the display apparatus. In this simple calculation only the influence of the electromechanical force and the counteracting force have been taken into account; other forces, such as the drag force, that reduce the speed of the water front with the distance of the water front from the reservoir, have not been taken into account.

FIGS. 6A(i)-6A(vi) show a schematic manufacturing process for manufacturing the first conventional steps of the electrofluidic pixel cell. In a first step (i) a substrate 620 is provided, typically of a polymer which is flexible with a bending radius for example smaller than 2 cm; then via patterning a metal layer (i.e. the gate) for a bottom gate 61 of a thin film transistor (TFT) deposited and structured on the substrate 620; subsequently an insulator layer 62 is provided to insulate the gate 61 of the TFT (iii) and the second metal layer (i.e. the source-drain 63) for the bottom gate, bottom contact TFT is deposited and structured (iv). Subsequently (step v), semiconductor material 64 deposited and structured for the bottom gate, bottom contact TFT and a thick layer 630 is provided and patterned by known photopatterning techniques (vi). The provision of thick layer 630 can be by any suitable provision technique. In an embodiment, the reservoir film layer is formed by a laminate layer 630 of a homogenous thickness that is laminated in the laminated resin structure, typically known as dry film adhesion or dry photoresist film lamination. Typically, the dry film photoresist layer may be covered by a coversheet of mylar or suitable sheet product which is removed after lamination and usually prior to photocuring. A suitable dry film layer material may be able to create high aspect ratio and/or thick film structures.

Other embodiments may include spin coating. The photo patterning techniques typically involve photo curing a pattern in the photosensitive resin layer, and removal of uncured material by dissolution, to form reservoir 632. Suitable solvents are propylene glycol monomethyl ether acetate, ethyl lactate or diacetone alcohol.

In FIG. 6B a laminated stacked structure 630, 640 is arranged on the circuit board 620 by depositing suitable homogenous resin film layer 640. The layer 640 can be deposited (in vii) by a hot roller 641 in a dry film hot roll lamination process known in the art. Typical hot roll conditions may involve a roll temperature of 65-85° C., a roll speed of about 1 m/min and a pressure of for example 45-55 psig. In this way (in viii) a stacked structure (630, 640) is formed by homogenous resin film layer 640 on the reservoir layer 630.

The resin film layer can then be patterned in a subsequent patterning process, typically also by photopatterning. An orifice 642 can thus be created, so that the reservoir that is arranged in the reservoir layer 630 is obscured in the direction of a viewer by the orifice film layer 640. The orifice film layer 640 defines a smallest orifice area 642 that is smaller than a cross sectional area formed in the reservoir film layer. The homogenous resin film layer further functions as an orifice film layer 640 arranged on the reservoir film layer 630. Although the orifice film layer may be deposited by any means suitable, in an embodiment it may be formed by a laminate layer 640 of a homogenous thickness that is laminated in the laminated resin structure. The orifice 642 can be made as small as needed, both in orifice area as well as orifice layer thickness. Suitably, the film layers 630, 640 have mutually differing thicknesses, with the orifice film layer having a thickness smaller than the reservoir layer. The orifice 642 may be regarded as a secondary reservoir part of the reservoir 632.

In FIG. 6C the pixel cell is further built up (x) by depositing and structuring a third metal layer (i.e. the reservoir electrode 643 and bottom channel electrode 644). Electrodes 643 or electrowetting layers are optional when arranged in bottom reservoir 632.

An electrical connection in a side wall of bottom reservoir can be used to keep the contact with the conducting polar fluid when the fluid is spreading out from the reservoir into the channel (see FIG. 6D).

Subsequently (xi), the insulator layer 645 of the channel electrode is deposited and structured, spacers 646 are deposited and structured and a fluoropolymer layer 647b is deposited.

With a reservoir layer having a radius of 45 micrometer and a height of 15 micrometer and a second orifice layer with a height of 8 micrometer and a radius of 16 micrometer the visible area of the reservoir may be reduced to 4%, while the total height of the reservoir remains identical to a conventional case with a single reservoir layer without a further shielding layer in the form of orifice layer. In such conventional case a pixel with typical lateral dimensions of 150×150 micrometer may be with a reservoir that should have an area that is at least 20% of the pixel area which is sufficiently less beneficial than the multilayered embodiment.

In the following example typical dimension are given for a thin foil display, which may be used in a rollable display apparatus. For the same pixel an even thinner second layer may be provided with a very small reservoir radius. When using a first reservoir layer that forms a reservoir height of about 15 micrometer with a radius of 47 micrometer and a second reservoir layer with a thickness of only 2 micrometer and a radius of only 4 micrometer, the visible area of the reservoir is reduced to 0.2%, while the total height of the reservoir is identical to the single layer case. A small radius for the orifice part will work when the polar fluid remains in contact with a small part of the channel 33 surrounding the reservoir, as in that case the Laplace pressure is still formed by the difference in radius of curvature between the radius of the polar fluid in the channel and the radius in the large reservoir part independent of the orifice area opening. Accordingly, suitably dimensioned layers in the resin stack structure include a reservoir layer 630 forming a reservoir with a reservoir height typically ranging between 15-50 micrometer, and an orifice layer 640 with a thickness typically ranging between 1 and 15 micrometer. In total, preferably the stacked structure is kept below 50 micrometer, more advantageously even below 30 micrometer. Of course, in other examples, such as billboards, the geometry may differ without loosing the inventive scope, for example, a pixel size could be several millimeters.

In FIG. 6D the top substrate stack 660 is placed (xii) typically comprising a transparent substrate 650, transparent electrode 649, a transparent insulator layer 648 and a transparent fluoropolymer 647t layer. The top stack 660 may be attached, for instance by gluing, on top of the spacers 646. The spacers have a form and structure so that channel 33 (shown in FIG. 2, 3) can be stably dimensioned to have a predefined thickness. The conductive polar fluid will remain in contact with the fluoropolymer layer 647t in the channel 33 to provide an electrowetting actuation effect when the electrodes are energized or de-energized. Depending on the amount of polar fluid 651 that remains in the reservoir 632 when the channel 33 is completely filled with the polar fluid 651 it may be sufficient to only have an electrical connection 643 present on a common side wall 643c of the reservoir 632 and orifice 642. Finally, the display is filled (xiii) with a non-polar fluid (not shown) and a polar (conducting) fluid 651. It is remarked that the exact dimensions and relative sizes may differ from what is depicted in the drawings. For example, in FIG. 6D the principal radius of the polar fluid in the reservoir should be larger than the principal radius of the polar fluid in the channel 631 in order to be able to switch the pixel. Also, the volume that can be occupied by the polar liquid in the reservoir should be at least as large as the volume that can be occupied by the polar liquid in the channel. It should be noted that the size of the orifice 642, that is the radii imposed by the orifice on the polar fluid, do not influence the switching properties of the pixel in case the polar liquid is occupying part of the reservoir and keeps contact with the top stack 660 in all switching states. In that case only the radii in the channel and the reservoir determine the switching properties. The dimensions of the orifice may then be chosen as small as possible to optimize the aperture of the pixel without affecting the switching properties of the pixel.

By photo patterning, the film layers are advantageously formed in a dry film curable resist layer forming the orifice and/or reservoir walls with zero inclination. With zero inclination, substantially zero inclination angles are comprised, which encompass inclination angles as a result of the conventional etching processes where no specific care is needed to have the inclination of the reservoir wall controlled. The proposed solution accordingly involves an additional coating or lamination step with associated patterning, as the reservoir 632 is now built from two separate layers 630, 640 but is easy to process, as it does not depend on negative slopes of the reservoir walls such as disclosed in US2010/0208328 or on electrowetting layers positioned at the bottom of a stack such as for example disclosed in US2006/0132404. Thus, an EFC pixel cell 600 is provided with an increased aperture by means of the orifice layer 640 with reduced orifice cross-section 642. In this way the large reservoir 632 is obscured from the viewer by the second layer 640 that has a smaller reservoir area 642. This improves the aperture and thus the optical properties (contrast, black level and/or white level, color gamut) of the display.

Figure 7:
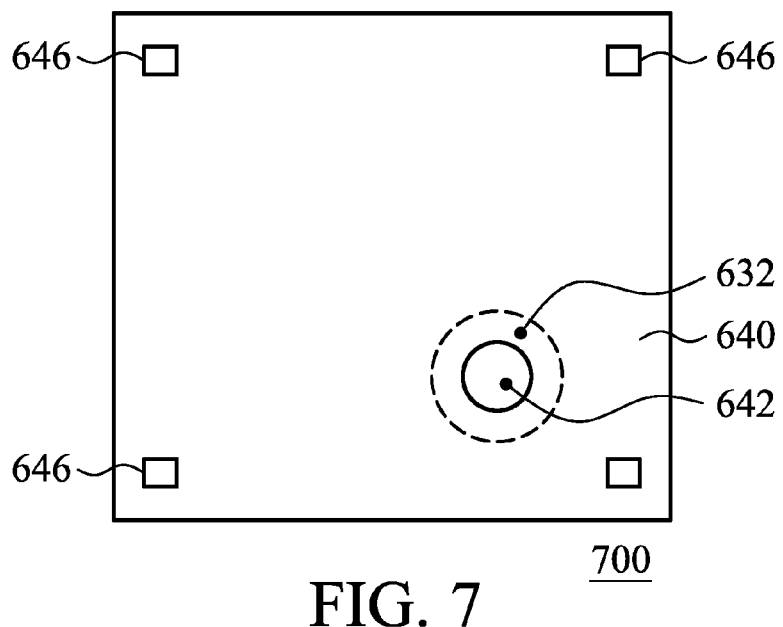
FIG. 7 shows a top view of the finished product.

FIG. 7 shows a plan view of a pixel 700 of this embodiment viewed from a user perspective. The dotted line shows the outline of the reservoir layer with the larger reservoir 632. This reservoir 632 is obscured by the second mesa layer 640 with orifice 642 (solid circle), thereby only showing the orifice 642 in the 2nd mesa layer 640 to the user. Spacers 646 are dimensioned so that the stack 660 (FIG. 6D) is stably carried with a predefined gap defining the channel thickness. Typically, four spacers 646 are placed in corner positions of the cell 700 but any number can be positioned as long as the spacers can form a stably dimensioned channel.

Figure 8:
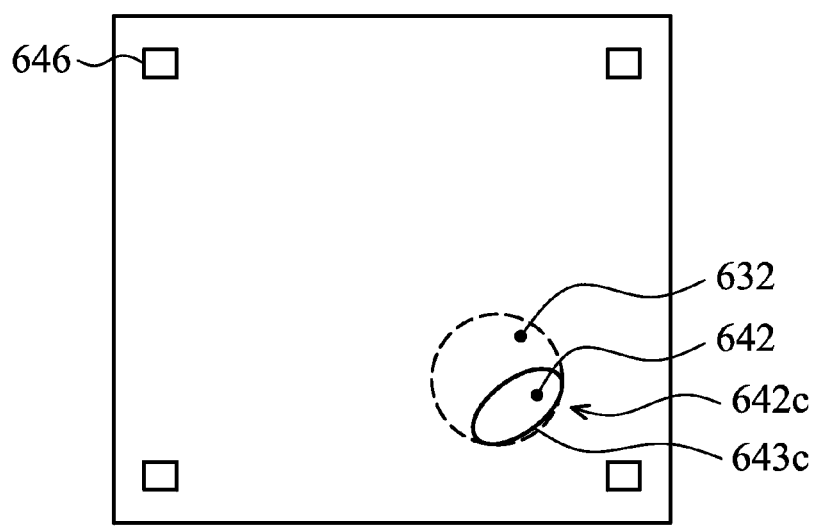
FIG. 8 shows an alternative arrangement of the finished product.

FIG. 8 shows a plan view of a second embodiment 800 of a pixel. In this embodiment, the orifice and/or reservoir layer have coinciding walls 642c to form the orifice 642. In particular, the orifice 642 shares a common side wall 642c with the reservoir 632 as is the case in FIG. 6B (ix). In this way it is possible to form a wall electrode 643c that can easily make an electrical connection from the layers located at or below the bottom of the reservoir to the conducting polar fluid through an electrode positioned at the aligned part of the side wall 642c of the orifice 642 and reservoir 632. In practical applications of the EFC this forms a reservoir electrode 643 (See FIG. 6C) that electrically contacts the polar fluid, and can be used in order to drive the pixels in an accurate and reproducible way and at reduced voltages.

Also, the electrode 643c does not need to fill the complete bottom of the first, large reservoir part 632, as it only needs to connect at one point in the reservoir 632 to an electrode that can be (indirectly) controlled by the display controller. Therefore a single contact point at the bottom is sufficient. This opens the possibility to apply the metal contact electrode after the second, smaller reservoir material has been applied and patterned. The contact electrode 643c (See FIG. 6D will then typically only be present at the side wall 642c of the orifice 642, an aligned part of the sidewall of the first, larger reservoir 632 and at the bottom directly under the orifice 642, although depending on the processing method of the metal electrode it can also be present at a small area outside this orifice opening.

The shapes and alignment of the two reservoir parts reservoir 632 and orifice 642 can be varied, although a circular orifice shape is preferred as either one of the liquids 651 will adapt more easily to a rounded shape than to an angled corner. Preferably, the reservoir parts 632, 642 are at least aligned at a part of one side 642c that is large enough to create a continuous electrode 643c from the channel 33 to the bottom 632b of the first, larger reservoir part.

This has the advantage that a robust contact between the electrodes on top of the bottom substrate and the polar liquid 651 can be made.

Figure 9:
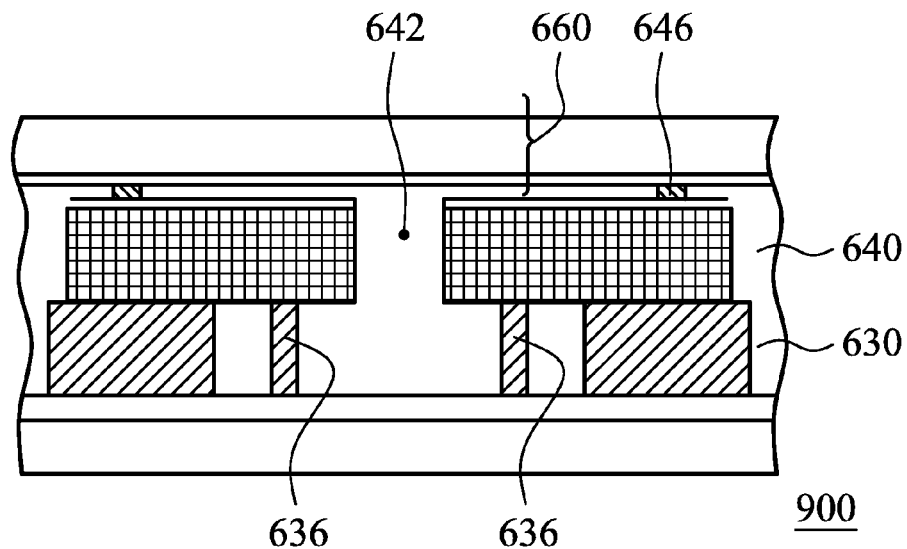
FIG. 9 shows another alternative arrangement.

FIG. 9 shows a cross sectional view of an embodiment 900 where the reservoir layer 630 contains a further enlarged reservoir area compared to orifice area 642 in the upper layer 640. Accordingly a third embodiment is shown, where additional support spacers 636 are provided in the first, larger reservoir part 630 to support the mesa material 640 used to form the orifice 642 as a second, smaller reservoir part. In this way, the reservoir film layer comprises a reservoir structure 632 with support spacers 636 supporting the orifice layer 640.

These spacers 636 can easily be added to the structure when structuring the first mesa layer. In principle, it is easily possible to extend this structure to a three or multilayer structure wherein a spacer arrangement 636 is provided with an aim to support any number of reservoir layers 630, 640, and only form a small orifice area in a top reservoir layer 640 that substantially obscures a direct view from above on the reservoir 632. In such embodiments, any of the film layers in the stack structure may be formed, through a lamination process, by laminate film layers of a homogenous thickness.

Figure 10:
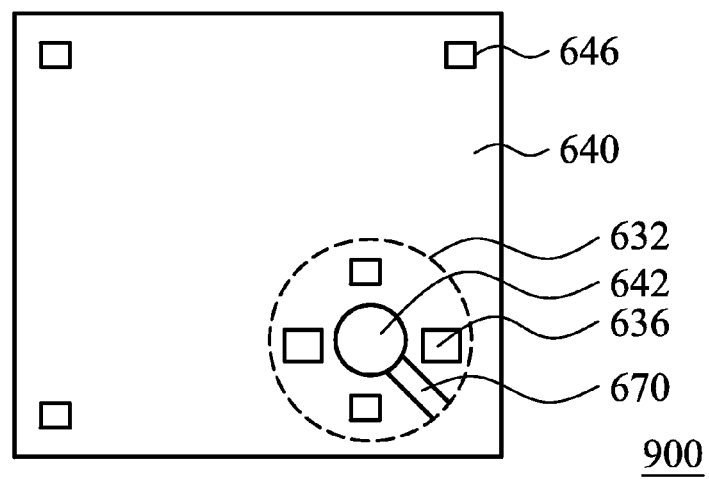
FIG. 10 shows a top view of the stacked structure of FIG. 9.

FIG. 10 shows an overview of a pixel 900 of this embodiment viewed from a user perspective. The dotted line shows the outline of the first mesa layer with the larger reservoir 632. Inside the dotted line show the spacers 636 are shown that support the second mesa layer 640 to form the reservoir. The 1st mesa layer 630 and the reservoir spacers 636 are obscured by the second mea layer 640 forming the orifice 642, thereby only showing the orifice 642 in the 2nd mesa layer 640 to a viewer. In the channel structure a duct 670 is provided to drain the non-polar fluid back to the reservoir 632 when the polar fluid 651 is actuated into the channel 33 by electrowetting.

Typically, the cell display property is expressed as the transmission and/or reflection of the pixel cell at a predefined wavelength or in a range of predefined wavelengths. The number of cell display properties is generally limited to a number of discrete levels within the complete range of possible transmission and/or reflection values. The pre-defined, discrete transmission and/or reflection values are measurable, physical values that can be represented by a (binary) number and as such can be processed by the controller.

While the invention has been illustrated and described in detail in the drawings and foregoing description, such illustration and description are to be considered illustrative or exemplary and not restrictive; the invention is not limited to the disclosed embodiments. In particular, unless clear from context, aspects of various embodiments that are treated in various embodiments separately discussed are deemed disclosed in any combination variation of relevance and physically possible and the scope of the invention extends to such combinations. In the embodiments, row electrodes are substantially similar in structure in respect of the column electrodes and can be interchanged with the column electrodes—that is a supply voltage to the pixel can be provided with a 'column' electrode having a column select voltage, whereas the row electrode is then provided with a corresponding row voltage for providing the supply voltage. Such and other variations to the disclosed embodiments can be understood and by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A display apparatus comprising a circuit board having row and column electrodes arranged thereon to connect a driver to a plurality of electrofluidic chromatophore (EFC) pixel cells provided on the circuit board, wherein each pixel cell comprises:

a fluid holder for holding a polar fluid and a non-polar fluid having differing display properties;

wherein the fluid holder comprises a reservoir having an orifice with a small visible area projected in the direction of a viewer, and wherein the fluid holder further comprises a channel with a geometry having a large visible area projected in the direction of a viewer, the channel being connected to the reservoir via said orifice so as to enable free movement of the polar fluid and non-polar fluid between the channel and the reservoir, at least part of a surface of the channel comprising a wetting property and at least two pixel cell terminals connectable to the row and column electrodes on the circuit board and being configured to supply a supply voltage to at least part of the surface of the channel comprising the wetting property for supply voltage controlled movement of polar fluid; the at least two pixel cell terminals dielectrically separated from the polar fluid;

wherein the reservoir is formed in a stacked structure of homogenous film layers arranged on the circuit board, the structure at least comprising an orifice film layer and a reservoir film layer, wherein the reservoir arranged in the reservoir layer is obscured in the direction of a viewer by the orifice film layer, said orifice film layer defining a smallest orifice area that is smaller than a cross sectional area formed in the reservoir film layer; and wherein the reservoir stack structure includes a reservoir layer forming a reservoir with a reservoir height ranging between 15-50 micrometer, and an orifice layer with a thickness ranging between 1 and 15 micrometer.

2. The display apparatus according to claim 1, wherein the orifice film layer is formed by a laminate resin layer of a homogenous thickness that is laminated in the stacked structure.

3. The display apparatus according to claim 1, wherein the reservoir film layer is formed by a laminate resin layer of a homogenous thickness that is laminated in the stacked structure.

4. The display apparatus according to claim 1, wherein any of the film layers in the stack structure is formed by laminate resin film layers of a homogenous thickness.

5. The display apparatus according to claim 1, wherein the film layers have mutually differing thicknesses, with the orifice film layer having a thickness smaller than the reservoir layer.

6. The display apparatus according to claim 1, wherein the film layers are formed by a dry film curable resist layer forming the orifice and/or reservoir walls with zero inclination.

7. The display apparatus according to claim 1, wherein the orifice and/or reservoir layer have a coinciding wall to form the orifice.

8. The display apparatus according to claim 1, wherein the reservoir film layer comprises a reservoir structure with support spacers supporting the orifice layer.

9. A method of manufacturing a display apparatus comprising a circuit board having row and column electrodes arranged thereon to connect a driver to a plurality of electrofluidic chromatophore (EFC) pixel cells provided on the circuit board, the method comprises:
 providing a fluid holder for holding a polar fluid and a non-polar fluid having differing display properties and at least two pixel cell terminals connectable to the row and column electrodes on the circuit board;
 wherein the fluid holder is with a reservoir having an orifice with a small visible area projected in the direction of a viewer, and wherein the fluid holder is provided a channel with a geometry having a large visible area projected in the direction of a viewer, the channel being connected to the reservoir via said orifice so as to enable free movement of the polar fluid and non-polar fluid between the channel and the reservoir, at least part of a surface of the channel comprising a wetting property and at least two pixel cell terminals connectable to the row and column electrodes on the circuit board and being configured to supply a supply voltage to at least part of the surface of the channel comprising the wetting property for supply voltage controlled movement of polar fluid; the at least two pixel cell terminals dielectrically separated from the polar fluid;
 wherein the reservoir is formed in a stacked structure of homogenous film layers arranged on the circuit board, the structure at least comprising an orifice film layer and a reservoir film layer, wherein the reservoir arranged in the reservoir layer is obscured in the direction of a viewer by the orifice film layer, said orifice film layer defining a smallest orifice area that is smaller than a cross sectional area formed in the reservoir film layer; and
 wherein the reservoir stack structure includes a reservoir layer forming a reservoir with a reservoir height ranging between 15-50 micrometer, and an orifice layer with a thickness ranging between 1 and 15 micrometer.

10. A method according to claim 9, wherein the orifice film layer is formed by laminating the orifice layer as a dry film resin layer of homogenous thickness on a reservoir layer in the stacked structure.

* * * * *